(12) United States Patent
Thakkar et al.

(10) Patent No.: US 11,130,692 B2
(45) Date of Patent: Sep. 28, 2021

(54) PROCESS AND APPARATUS FOR DOSING NUTRIENTS TO A BIOREACTOR

(71) Applicant: UOP LLC, Des Plaines, IL (US)

(72) Inventors: Killol H. Thakkar, Des Plaines, IL (US); Robert W. Brafford, Northbrook, IL (US); Eric C. Tompkins, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 456 days.

(21) Appl. No.: 16/015,579

(22) Filed: Jun. 22, 2018

(65) Prior Publication Data

US 2019/0002318 A1 Jan. 3, 2019

Related U.S. Application Data

(60) Provisional application No. 62/525,944, filed on Jun. 28, 2017.

(51) Int. Cl.
| | |
|---|---|
| *C02F 3/00* | (2006.01) |
| *C02F 1/68* | (2006.01) |
| *C02F 101/10* | (2006.01) |

(52) U.S. Cl.
CPC .............. *C02F 3/006* (2013.01); *C02F 1/685* (2013.01); *C02F 1/686* (2013.01); *C02F 2101/106* (2013.01); *C02F 2209/15* (2013.01); *C02F 2209/40* (2013.01); *C02F 2305/06* (2013.01)

(58) Field of Classification Search
None
See application file for complete search history.

(56) References Cited

U.S. PATENT DOCUMENTS

| | | | | |
|---|---|---|---|---|
| 3,541,513 | A | * 11/1970 | Patterson | G06F 13/124 340/10.41 |
| 4,159,239 | A | 6/1979 | Schwartz | 208/113 |
| 4,267,458 | A | 5/1981 | Uram | 290/40 R |
| 4,284,494 | A | 8/1981 | Bartholic | 208/164 |
| 4,362,614 | A | 12/1982 | Asdigian | |
| 4,380,146 | A | 4/1983 | Yannone | 60/39.281 |
| 4,385,985 | A | 5/1983 | Gross | 208/113 |
| 4,411,773 | A | 10/1983 | Gross | 208/159 |
| 4,709,546 | A | 12/1987 | Weiler | 415/116 |
| 4,775,460 | A | 10/1988 | Reno | |
| 4,795,545 | A | 1/1989 | Schmidt | |
| 4,902,469 | A | 2/1990 | Watson | 376/216 |
| 5,077,252 | A | 12/1991 | Owen et al. | 502/43 |
| 5,197,008 | A | * 3/1993 | Itoh | B60K 28/16 180/197 |

(Continued)

FOREIGN PATENT DOCUMENTS

| | | | | |
|---|---|---|---|---|
| EP | 0181744 A1 | 5/1986 | | B65G 53/66 |
| EP | 2746884 A1 | 6/2014 | | G05B 23/02 |

(Continued)

OTHER PUBLICATIONS

"Wastewater Treatment Fact Sheet: External Carbon Sources for Nitrogen Removal," US EPA, Aug. 2013 (Year: 2013).*

(Continued)

*Primary Examiner* — Chester T Barry

(57) ABSTRACT

The present invention relates to a control system for a bioreactor. More particularly, this invention relates to a process and apparatus for reading the characteristics of an industrial waste water stream and dosing amount of nutrients that play a key role to help the microorganisms in the bioreactor work efficiently to remove impurities from the industrial wastewater stream.

16 Claims, 1 Drawing Sheet

(56) References Cited

U.S. PATENT DOCUMENTS

| | | | |
|---|---|---|---|
| 5,227,121 A | 7/1993 | Scarola | 340/525 |
| 5,582,684 A | 12/1996 | Holmqvist et al. | |
| 5,605,435 A | 2/1997 | Haugen | 137/514 |
| 5,616,214 A | 4/1997 | Leclerc | |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,073,905 A * | 6/2000 | Wilson | B01D 46/04 |
| | | | 251/61 |
| 6,081,230 A | 6/2000 | Hoshino | 342/357.32 |
| 6,129,104 A * | 10/2000 | Ellard | C02F 3/006 |
| | | | 137/3 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,458,268 B1 * | 10/2002 | Grandprey | C02F 1/52 |
| | | | 210/101 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsiung et al. | 700/9 |
| 7,415,357 B1 | 8/2008 | Stluka et al. | 702/6 |
| 7,567,887 B2 | 7/2009 | Emigholz et al. | 702/182 |
| 7,608,190 B1 * | 10/2009 | Banerjee | B01J 20/0222 |
| | | | 210/663 |
| 7,742,833 B1 | 6/2010 | Herbst et al. | 700/108 |
| 7,836,941 B2 | 11/2010 | Song et al. | |
| 7,877,596 B2 | 1/2011 | Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,568,592 B2 * | 10/2013 | Coleman | C02F 3/308 |
| | | | 210/605 |
| 8,571,064 B2 | 10/2013 | Kore et al. | 370/469 |
| 8,630,962 B2 | 1/2014 | Maeda et al. | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,571,919 B2 | 2/2017 | Zhang et al. | |
| 9,580,341 B1 | 2/2017 | Brown et al. | |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | |
| 2004/0148144 A1 | 7/2004 | Martin | |
| 2004/0204775 A1 | 10/2004 | Keyes | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0009033 A1 | 1/2005 | Gray et al. | 95/96 |
| 2005/0027721 A1 | 2/2005 | Saenz | 707/100 |
| 2005/0029163 A1 | 2/2005 | Letzsch | 208/113 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0215552 A1 * | 9/2007 | Williams | B01J 41/05 |
| | | | 210/683 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0084323 A1 * | 4/2008 | Stad | G05B 9/02 |
| | | | 340/652 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 | 11/2008 | Plaza et al. | |
| 2009/0015459 A1 * | 1/2009 | Mahler | G01S 7/023 |
| | | | 342/22 |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |
| 2009/0246519 A1 * | 10/2009 | Hanson | C12P 3/00 |
| | | | 428/364 |
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0089825 A1 * | 4/2010 | Canzano | C02F 3/006 |
| | | | 210/610 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0252499 A1 * | 10/2010 | Janssen | C02F 3/302 |
| | | | 210/614 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |

(56) References Cited

U.S. PATENT DOCUMENTS

| | | | |
|---|---|---|---|
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0211417 A1* | 8/2012 | Vegso | C02F 3/305 |
| | | | 210/614 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim et al. | 73/40.5 R |
| 2013/0079899 A1 | 3/2013 | Baramov | 700/32 |
| 2013/0085683 A1* | 4/2013 | Garcia | C02F 3/006 |
| | | | 702/25 |
| 2013/0090088 A1 | 4/2013 | Chevsky et al. | 455/411 |
| 2013/0094422 A1 | 4/2013 | Thanikachalam | 370/312 |
| 2013/0172643 A1 | 7/2013 | Pradeep | 585/310 |
| 2013/0187643 A1* | 7/2013 | Lysen | G01N 27/9046 |
| | | | 324/238 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2013/0327052 A1 | 12/2013 | O'Neill | 60/772 |
| 2014/0008035 A1 | 1/2014 | Patankar et al. | |
| 2014/0026598 A1 | 1/2014 | Trawicki | 62/56 |
| 2014/0074273 A1 | 3/2014 | Mohideen et al. | 700/98 |
| 2014/0083934 A1* | 3/2014 | Brown | C02F 3/12 |
| | | | 210/605 |
| 2014/0114039 A1 | 4/2014 | Benham et al. | 526/348.5 |
| 2014/0131027 A1 | 5/2014 | Chir | 165/300 |
| 2014/0147509 A1* | 5/2014 | Menashe | A61K 9/50 |
| | | | 424/495 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0263039 A1* | 9/2014 | Horst | C02F 1/66 |
| | | | 210/602 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2014/0337277 A1 | 11/2014 | Asenjo et al. | |
| 2014/0353247 A1* | 12/2014 | Newcombe | C02F 3/006 |
| | | | 210/610 |
| 2015/0059714 A1 | 3/2015 | Bernards | 123/568.11 |
| 2015/0060331 A1 | 3/2015 | Sechrist et al. | |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | 60/780 |
| 2015/0185716 A1 | 7/2015 | Wichmann et al. | 700/287 |
| 2015/0276208 A1 | 10/2015 | Maturana et al. | 700/274 |
| 2015/0284641 A1 | 10/2015 | Shi | 208/113 |
| 2015/0330571 A1 | 11/2015 | Beuneken | 141/4 |
| 2016/0033941 A1 | 2/2016 | T et al. | 700/81 |
| 2016/0048419 A1 | 2/2016 | Wojsznis | 700/1 |
| 2016/0098037 A1 | 4/2016 | Zornio et al. | 700/20 |
| 2016/0098234 A1 | 4/2016 | Weaver | 358/1.15 |
| 2016/0122663 A1 | 5/2016 | Pintar et al. | |
| 2016/0145131 A1* | 5/2016 | Manic | C02F 3/305 |
| | | | 210/607 |
| 2016/0147204 A1 | 5/2016 | Wichmann et al. | 700/287 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2016/0313653 A1 | 10/2016 | Mink | |
| 2016/0363315 A1 | 12/2016 | Colannino et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0107188 A1 | 4/2017 | Kawaguchi | |
| 2017/0284410 A1 | 10/2017 | Sharpe, Jr. | |
| 2017/0306379 A1* | 10/2017 | Piens et al. | C12N 15/80 |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0009687 A1* | 1/2018 | Murthy | C02F 3/307 |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |
| 2018/0197350 A1 | 7/2018 | Kim | |
| 2018/0275690 A1 | 9/2018 | Lattanzio et al. | |
| 2018/0275691 A1 | 9/2018 | Lattanzio et al. | |
| 2018/0275692 A1 | 9/2018 | Lattanzio et al. | |
| 2018/0280914 A1 | 10/2018 | Victor et al. | |
| 2018/0280917 A1 | 10/2018 | Victor et al. | |
| 2018/0282633 A1 | 10/2018 | Van de Cotte et al. | |
| 2018/0282634 A1 | 10/2018 | Van de Cotte et al. | |
| 2018/0282635 A1 | 10/2018 | Van de Cotte et al. | |
| 2018/0283368 A1 | 10/2018 | Van de Cotte et al. | |
| 2018/0283392 A1 | 10/2018 | Van de Cotte et al. | |
| 2018/0283404 A1 | 10/2018 | Van de Cotte et al. | |
| 2018/0283811 A1 | 10/2018 | Victor et al. | |
| 2018/0283812 A1 | 10/2018 | Victor et al. | |
| 2018/0283813 A1 | 10/2018 | Victor et al. | |
| 2018/0283815 A1 | 10/2018 | Victor et al. | |
| 2018/0283816 A1 | 10/2018 | Victor et al. | |
| 2018/0283818 A1 | 10/2018 | Victor et al. | |
| 2018/0284705 A1 | 10/2018 | Van de Cotte et al. | |
| 2018/0286141 A1 | 10/2018 | Van de Cotte et al. | |
| 2018/0311609 A1 | 11/2018 | McCool et al. | |
| 2018/0362862 A1 | 12/2018 | Gellaboina et al. | |
| 2018/0363914 A1 | 12/2018 | Faiella et al. | |
| 2018/0364747 A1 | 12/2018 | Charr et al. | |
| 2019/0002318 A1 | 1/2019 | Thakkar et al. | |
| 2019/0003978 A1 | 1/2019 | Shi et al. | |
| 2019/0015806 A1 | 1/2019 | Gellaboina et al. | |
| 2019/0041813 A1 | 2/2019 | Horn et al. | |
| 2019/0083920 A1 | 3/2019 | Bjorklund et al. | |
| 2019/0101336 A1 | 4/2019 | Victor et al. | |
| 2019/0101342 A1 | 4/2019 | Victor et al. | |
| 2019/0101907 A1 | 4/2019 | Charr et al. | |
| 2019/0102966 A1 | 4/2019 | Lorenz | |
| 2019/0108454 A1 | 4/2019 | Banerjee et al. | |
| 2019/0120810 A1 | 4/2019 | Kumar KN et al. | |
| 2019/0135665 A1* | 5/2019 | Jenkins | C02F 3/302 |
| 2019/0151814 A1 | 5/2019 | Victor et al. | |
| 2019/0155259 A1 | 5/2019 | Romatier et al. | |
| 2019/0175681 A1* | 6/2019 | O'Kennedy | A23L 33/15 |
| 2019/0361413 A1* | 11/2019 | Alber | C02F 3/006 |
| 2020/0325051 A1* | 10/2020 | Gil | C02F 11/02 |
| 2020/0339457 A1* | 10/2020 | Basu | B01D 21/0012 |

FOREIGN PATENT DOCUMENTS

| | | | | |
|---|---|---|---|---|
| EP | 2801937 A1 | 11/2014 | | G06Q 10/06 |
| GB | 1134439 A | 11/1968 | | G01N 31/22 |
| WO | 9010083 A1 | 9/1990 | | |
| WO | WO 2001/060951 A1 | 8/2001 | | C10G 51/04 |
| WO | WO 2006/044408 A1 | 4/2006 | | F23D 14/72 |
| WO | WO 2007/095585 A2 | 8/2007 | | A61K 31/721 |
| WO | WO 2009/046095 A1 | 4/2009 | | G06F 11/00 |
| WO | WO 2014/042508 A1 | 3/2014 | | G06Q 50/04 |
| WO | WO 2014/123993 A1 | 8/2014 | | G06F 17/00 |
| WO | WO-2015062613 A1 * | 5/2015 | | C02F 3/006 |
| WO | WO 2016/141128 A1 | 9/2016 | | G06Q 10/06 |
| WO | WO 2017/079058 A1 | 5/2017 | | |

OTHER PUBLICATIONS https://www.chem.fsu.edu/chemlab/Mastering/PhosphateBuffers.htm (downloaded Aug. 10, 2020). (Year: 2020).* https://en.wikipedia.org/wiki/Phosphoric_acid (downloaded Aug. 10, 2020) (Year: 2020).*

(56) References Cited

OTHER PUBLICATIONS

Website of Environmental Operating Solutions, Inc (downloaded Aug. 10, 2020) (Year: 2020).*
WO App. PCT/US2018/039468: International Search Report and Written Opinion (dated Oct. 18, 2018).
WO App. No. PCT/US2018/039468: International Preliminary Report on Patentability (dated Dec. 31, 2019)—4 pages.
WO App. No. PCT/US2018/039468: Notification Concerning Transmittal of International Preliminary Report on Patentability (Chapter I of the Patent Cooperation Treaty) (dated Dec. 31, 2019)—3 pages.
Bespalov A. V. et al., Control systems of chemical and technological processes, pp. 508-509 (2001) (Russian), No translation.
Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).
EnergyMEDOR®, Product brochure (Nov. 2014).
Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD==> (Year: 2016).
Lotters, Real-time Composition Determination of Gas Mixtures, [online], 2015, [retrieved on Jun. 19, 2019]. Retrieved from <https://www .ama-science.org/proceedings/getFile/ZwNOZj==>(Year: 2015).
Maybeck, Peter S., "Stochastic models, estimation, and control," vol. 1, Academic Press (1979), 19 pages.
U.S. Appl. No. 15/058,658, filed Mar. 3, 2015, Ian G. Horn Zak Alzein Paul Kowalczyk Christophe Romatier, System and Method for Managing Web-Based Refinery Performance Optimization Using Secure Cloud Computing.
U.S. Appl. No. 15/640,120, filed Mar. 30, 2015, Ian G. Horn Zak Alzein Paul Kowalczyk Christophe Romatier, Evaluating Petrochemical Plant Errors to Determine Equipment Changes for Optimized Operations.
U.S. Appl. No. 15/851,207, filed Mar. 27, 2017, Louis A. Lattanzio Alex Green Ian G. Horn Matthew R. Wojtowicz, Operating Slide Valves in Petrochemical Plants or Refineries.
U.S. Appl. No. 15/851,343, filed Dec. 21, 2017, Louis A. Lattanzio Alex Green Ian G. Horn Matthew R. Wojtowicz, Early Prediction and Detection of Slide Valve Sticking in Petrochemical Plants or Refineries.
U.S. Appl. No. 15/851,360, filed Mar. 27, 2017, Louis A. Lattanzio Alex Green Ian G. Horn Matthew R. Wojtowicz, Measuring and Determining Hot Spots in Slide Valves for Petrochemical Plants or Refineries.
U.S. Appl. No. 15/853,689, filed Mar. 30, 2015, Ian G. Horn Zak Alzein Paul Kowalczyk Christophe Romatier, Cleansing System for a Feed Composition Based on Environmental Factors.
U.S. Appl. No. 15/858,767, filed Dec. 28, 2017, Ian G. Horn Zak Alzein Paul Kowalczyk Christophe Romatier, Chemical Refinery Performance Optimization.
U.S. Appl. No. 15/899,967, filed Feb. 20, 2018, Joel Kaye, Developing Linear Process Models Using Reactor Kinetic Equations.
U.S. Appl. No. 15/935,827, filed Mar. 28, 2017, Michael R. Van de Cotte Ian G. Horn, Rotating Equipment in a Petrochemical Plant or Refinery.
U.S. Appl. No. 15/935,847, filed Mar. 28, 2017, Michael R. Van de Cotte Ian G. Horn, Rotating Equipment in a Petrochemical Plant or Refinery.
U.S. Appl. No. 15/935,872, filed Mar. 28, 2017, Michael R. Van de Cotte Ian G. Horn, 3744early Surge Detection of Rotating Equipment in a Petrochemical Plant or Refinery.
U.S. Appl. No. 15/935,898, filed Mar. 28, 2017, Michael R. Van de Cotte Ian G. Horn, Reactor Loop Fouling Monitor for Rotating Equipment in a Petrochemical Plant or Refinery.
U.S. Appl. No. 15/935,920, filed Mar. 28, 2017, Michael R. Van de Cotte Ian G. Horn, Sensor Location for Rotating Equipment in a Petrochemical Plant or Refinery.
U.S. Appl. No. 15/935,935, filed Mar. 28, 2017, Michael R. Van de Cotte Ian G. Horn, Determining Quality of Gas for Rotating Equipment in a Petrochemical Plant or Refinery.
U.S. Appl. No. 15/935,950, filed Mar. 28, 2017, Michael R. Van de Cotte Ian G. Horn, Determining Quality of Gas for Rotating Equipment in a Petrochemical Plant or Refinery.
U.S. Appl. No. 15/935,957, filed Mar. 28, 2017, Michael R. Van de Cotte Ian G. Horn, Using Molecular Weight and Invariant Mapping to Determine Performance of Rotating Equipment in a Petrochemical Plant or Refinery.
U.S. Appl. No. 15/937,484, filed Mar. 28, 2017, Sanford A. Victor Phillip F. Daly Ian G. Horn, Detecting and Correcting Maldistribution in Heat Exchangers in a Petrochemical Plant or Refinery.
U.S. Appl. No. 15/937,499, filed Mar. 28, 2017, Sanford A. Victor Phillip F. Daly Ian G. Horn, Detecting and Correcting Cross-Leakage in Heat Exchangers in a Petrochemical Plant or Refinery.
U.S. Appl. No. 15/937,517, filed Mar. 28, 2017, Sanford A. Victor Phillip F. Daly Ian G. Horn, Strain Gauges and Detecting Pre-Leakage in Heat Exchangers in a Petrochemical Plant or Refinery.
U.S. Appl. No. 15/937,535, filed Mar. 28, 2017, Sanford A. Victor Phillip F. Daly Ian G. Horn, Detecting and Correcting Thermal Stresses in Heat Exchangers in a Petrochemical Plant or Refinery.
U.S. Appl. No. 15/937,588, filed Mar. 28, 2017, Sanford A. Victor Phillip F. Daly Ian G. Horn, Detecting and Correcting Problems in Liquid Lifting in Heat Exchangers.
U.S. Appl. No. 15/937,602, filed Mar. 28, 2017, Sanford A. Victor Phillip F. Daly Ian G. Horn, Air-Cooled Heat Exchangers.
U.S. Appl. No. 15/937,614, filed Mar. 28, 2017, Sanford A. Victor Phillip F. Daly Ian G. Horn, Wet-Cooled Heat Exchanger.
U.S. Appl. No. 15/937,624, filed Mar. 28, 2017, Sanford A. Victor Phillip F. Daly Ian G. Horn, Heat Exchangers in a Petrochemical Plant or Refinery.
U.S. Appl. No. 15/963,840, filed Apr. 28, 2017, Ryan McCool Chad E. Bjorklund Jorge Charr Luk Verhulst, Remote Monitoring of Adsorber Process Units.
U.S. Appl. No. 15/972,974, filed Jun. 20, 2017, Jorge Charr Kevin Carnes Ralph Davis Donald A. Eizenga Christina L. Ilaasser James W. Harris Raul A. Ohaco Daliah Papoutsis, Incipient Temperature Excursion Mitigation and Control.
U.S. Appl. No. 15/979,421, filed May 14, 2018, Mahesh K. Gellaboina Louis A. Lattanzio, Catalyst Transfer Pipe Plug Detection.
U.S. Appl. No. 16/007,669, filed Jun. 28, 2017, Yili Shi Daliah Papoutsis Jonathan Andrew Tertel, Process and Apparatus to Detect Mercaptans in a Caustic Stream.
U.S. Appl. No. 16/011,600, filed Jun. 19, 2017, Theodore Peter Faiella Colin J. Deller Raul A. Ohaco, Remote Monitoring of Fired Heaters.
U.S. Appl. No. 16/011,614, filed Jun. 19, 2017, Mahesh K. Gellaboina Michael Terry Seth Huber Danielle Schindlbeck, Catalyst Cycle Length Prediction Using Eigen Analysis.
U.S. Appl. No. 16/015,579, filed Jun. 28, 2017, Killol H. Thakkar Robert W. Brafford Eric C. Tompkins, Process and Apparatus for Dosing Nutrients to a Bioreactor.
U.S. Appl. No. 16/133,623, filed Sep. 18, 2017, Chad E. Bjorklund Jeffrey Guenther Stephen Kelley Ryan McCool, Remote Monitoring of Pressure Swing Adsorption Units.
U.S. Appl. No. 16/140,770, filed Oct. 20, 2017, Dinesh Kumar KN Soumendra Mohan Banerjee, System and Method to Optimize Crude Oil Distillation or Other Processing by Inline Analysis of Crude Oil Properties.
U.S. Appl. No. 16/148,763, filed Oct. 2, 2017, Jorge Charr Bryan J. Egolf Dean E. Rende Mary Wier Guy B. Woodle Carol Zhu, Remote Monitoring of Chloride Treaters Using a Process Simulator Based Chloride Distribution Estimate.
U.S. Appl. No. 16/151,086, filed Oct. 5, 2017, Soumendra Mohan Banerjee Deepak Bisht Priyesh Jayendrakumar Jain Krishna Mani Gautam Pandey, Harnessing Machine Learning & Data Analytics for a Real Time Predictive Model for a Fcc Pre-Treatment Unit.
U.S. Appl. No. 16/154,138, filed Oct. 8, 2018, Raul A. Ohaco Jorge Charr, High Purity Distillation Process Control with Multivariable and Model Predictive Control (Mpc) and Fast Response Analyzer.

(56) References Cited

OTHER PUBLICATIONS

U.S. Appl. No. 16/154,141, filed Oct. 8, 2018, Ian G. Horn Zak Alzein Paul Kowalczyk Christophe Romatier, System and Method for Improving Performance of a Plant with a Furnace.
U.S. Appl. No. 16/215,101, filed Dec. 10, 2018, Louis A. Lattanzio Christopher Schindlbeck, Delta Temperature Control of Catalytic Dehydrogenation Process Reactors.
U.S. Appl. No. 16/252,021, filed Sep. 16, 2016, Christophe Romatier Zak Alzein Ian G. Horn Paul Kowalczyk David Rondeau, Petrochemical Plant Diagnostic System and Method for Chemical Process Model Analysis.
U.S. Appl. No. 16/253,181, filed Mar. 28, 2017, Ian G. Horn Phillip F. Daly Sanford A. Victor, Detecting and Correcting Vibration in Heat Exchangers.
U.S. Appl. No. 16/363,406, filed Mar. 30, 2018, Louis A. Lattanzio Abhishek Pednekar, Catalytic Dehydrogenation Reactor Performance Index.

* cited by examiner

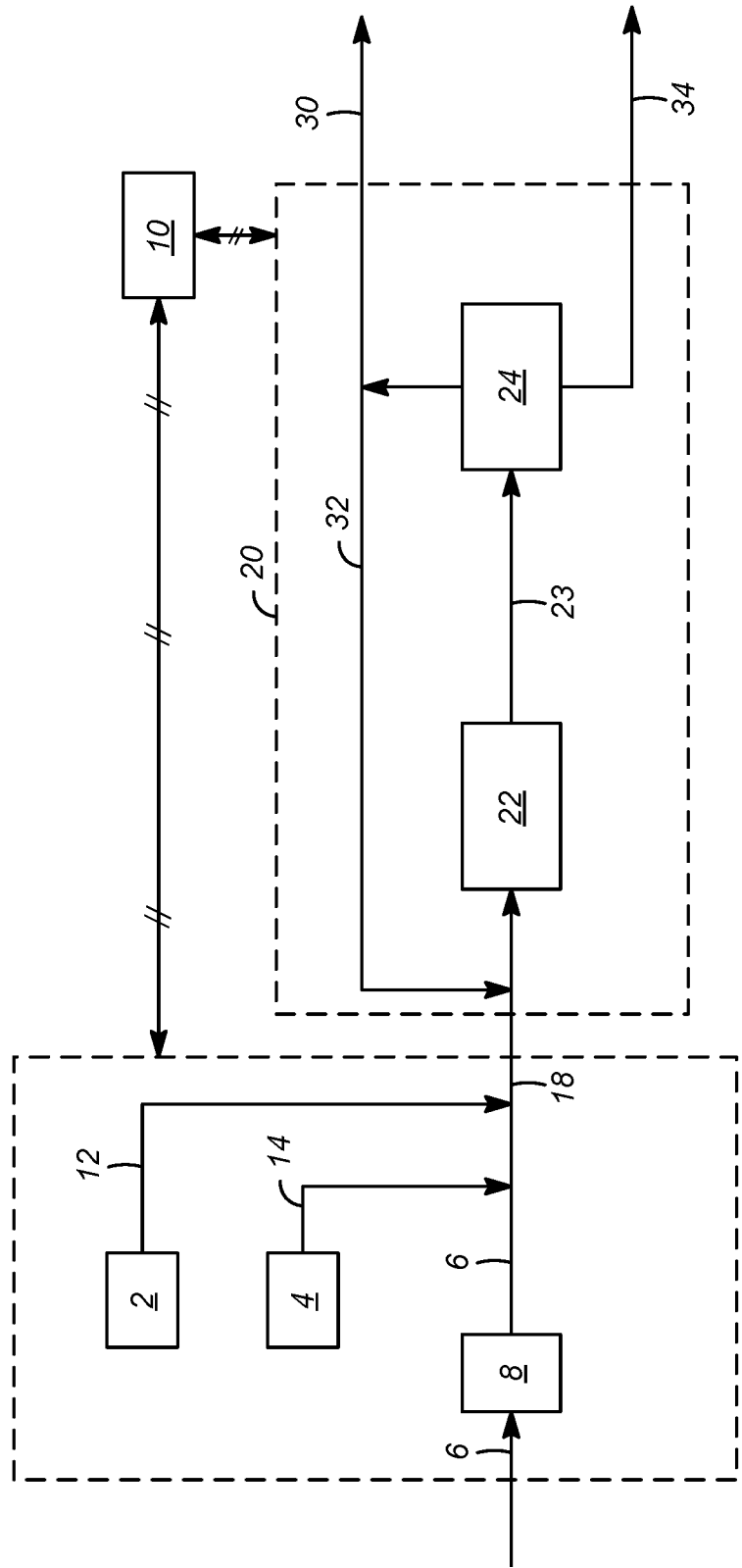

PROCESS AND APPARATUS FOR DOSING NUTRIENTS TO A BIOREACTOR

CROSS-REFERENCE TO RELATED APPLICATION

This application claims priority from Provisional Application No. 62/525,944 filed Jun. 28, 2017, the contents of which cited application are hereby incorporated by reference in its entirety.

BACKGROUND

The present invention relates to a control system for a bioreactor. More particularly, this invention relates to a process and apparatus for dosing amount of nutrients that play a key role to help the microorganisms in the bioreactor work efficiently to remove impurities from industrial wastewater.

This amount of dosing is completely dependent on the incoming flow rate of industrial wastewater entering the bioreactor. Hence, the operator/field personnel has to constantly monitor the incoming flow rate at the control system graphics to calculate, derive and manually enter an efficient dosing rate of nutrients to be injected along with the wastewater to the bioreactor for proper utilization of the microbes. Due to various industrial operations upstream to the wastewater treatment plant, the wastewater flow rate is always varying entering the bioreactor, making it difficult for the operator/field personnel to manipulate the dosing of nutrients to the bioreactor for maintaining high accuracy of the ratio between the nutrients with constantly changing wastewater flow rate. Further, industry also has to allocate efficient, trained, and knowledgeable field personnel to operate the above-mentioned function at the control system.

SUMMARY

The present invention is a process and apparatus for dosing amount of nutrients that play a key role to help the microorganisms in the bioreactor work efficiently to remove impurities from industrial wastewater.

An embodiment of the invention comprises a process for treatment of water that contains contaminants comprising measuring a parameter of a water stream; dosing an amount of nutrients needed; adding the nutrients to the water stream to create a treated water stream; and sending the treated water stream to a bioreactor.

An additional embodiment of the invention comprises a system for treatment of water that contains contaminants comprising a measuring device in fluid communication with an inlet water source containing at least one contaminant; a nutrient dosing unit in fluid communication with the inlet water source wherein the nutrient dosing unit is controlled by a control system; and a treated water source in fluid communication with a bioreactor.

BRIEF DESCRIPTION OF THE DRAWING

The FIGURE is a schematic view of the present invention.

DETAILED DESCRIPTION

The present process and apparatus can be used for dosing amount of nutrients that play a key role to help the microorganisms in the bioreactor work efficiently to remove impurities from industrial wastewater.

Description of the present invention will be made with respect to the FIGURE. The present invention comprises a process and apparatus for dosing amount of nutrients that play a key role to help the microorganisms in the bioreactor work efficiently to remove impurities from industrial wastewater. Referring to the FIGURE, a bioreactor control system 10 for removing one or more contaminants from an industrial waste water source is shown. The system 10 includes a bioreactor section 20. The bioreactor control system 10 includes inputs and outputs. The bioreactor section 20 may comprise more than one bioreactor. In the embodiment illustrated in the FIGURE, there is a first bioreactor 22 and a second bioreactor 24. Bioreactor technology removes impurities such as selenium, from industrial wastewater, to make the wastewater comply with environmental safety regulations before being discharged into the environment by industry. The bioreactors may be filled with living microorganisms that helps remove the impurities by absorbing them from the wastewater as their food to survive. In addition to the impurities from wastewater like selenium, the microbes also need balanced acidity and other important nutrients from the wastewater to sustain their lives for longer periods as well as to reproduce and generate more of its kind. The bioreactor section 20 and its control system 10 helps achieve the balance of regulating flow of wastewater to the micro-organisms residing in the bioreactor and the amount of nutrients to mix with wastewater to help the microbes live and grow. The bioreactor control system 10 and its associated equipment provides user-friendly interface with touch-screen graphics tied with a logic controller to regulate the flow of wastewater to the bioreactor filled with microorganisms by managing the recycle pumps and to maintain the dosing of the nutrients to the wastewater by controlling the nutrient pumps. The bioreactor control system 10 may also keep watch on ORP (Oxidation-Reduction Potential) and DO (Dissolved Oxygen) in the bioreactor and in the wastewater lines for maintaining proper limits for microbes' survival and growth.

The bioreactor control system includes a first supply tank 2 and a second supply tank 4. The first supply tank 2 includes MicroC® brand carbon source and the second supply tank 4 includes phosphoric acid. The dosing amount of nutrients such as phosphoric acid ($H_3PO_4$) and MicroC® plays a key role to help the microorganisms in the bioreactor work efficiently to remove impurities from industrial wastewater. The control system graphics may provide an interface for the field personnel to manually enter the amount of dosing in terms of gallons per hour for each type of nutrients. In one embodiment, the amount of dosing is completely dependent on the incoming flow rate of industrial wastewater entering the bioreactor. In another embodiment, the amount of dosing is completely dependent on the nitrate levels of the industrial wastewater entering the bioreactor. Hence, the operator/field personnel has to constantly monitor the incoming flow rate and the nitrate levels at the control system graphics to calculate, derive and manually enter an efficient dosing rate of nutrients to be injected along with the wastewater to the bioreactor for proper utilization of the microbes. The flow and nitrate level of the industrial wastewater may be read by a meter 8 on the wastewater stream 6.

Due to various industrial operations upstream to the wastewater treatment plant, the flow rate and nitrate level of the wastewater stream 6 is always varying entering the bioreactor 20, making it hard for the operator/field personnel to manipulate the dosing of nutrients to the bioreactor 20 for maintaining high accuracy of the ratio between the nutrients with constantly changing wastewater stream 6 flow rate. In addition to that, the industry also has to allocate efficient, trained and knowledgeable field personnel to operate the above mentioned function at the control system interface throughout the operation of the unit which is generally in most industries twenty four hours of every day of the year. Once the meter 8 reads the flow and nitrate level of the wastewater stream 6, the control system 10 calculates the dosage of MicroC® and phosphoric acid needed to add to the bioreactor 20. Once the amount of MicroC® and phosphoric acid is known, the control system 10 automates the amount of MicroC® and phosphoric acid needed to come from the MicroC® supply tank 2 and phosphoric acid supply tank 4 to be added to the wastewater stream 6. The MicroC® is added to the wastewater stream 6 via stream 12 and the phosphoric acid is added to the wastewater stream 6 via stream 14. Therefore, the treated stream 18 enters the bioreactor 20 having the necessary amounts of MicroC® and phosphoric acid needed. The treated stream 18 then enters the bioreactor section 20. In the example illustrate in the FIGURE, the bioreactor 20 section includes two bioreactors. The treated stream enters the first bioreactor 22 which produces a first bioreactor product stream 23. The first bioreactor product stream 23 then enters the second bioreactor 24. The second bioreactor 24 produces a product stream 30 and a waste stream 34, which is essentially a sludge disposal. A recycle stream 32 may be taken from the product stream 30 to go back to the first bioreactor 22.

There are several benefits to the bioreactor control system 10. The bioreactor control system 10 mitigates the requirement of spending capital for external storage and feeding systems upstream to stabilize the wastewater flow, and also minimizes the need to have a person monitoring the incoming wastewater flow rate for manual adjustment of the dosing rate of nutrients to bioreactor and to increase the efficiency of bioreactor by achieving accurate dosing ratios. An automatic dosing mode is incorporated as part of the logic program in the controller tied with some updates to user-friendly graphic interface. The automatic dosing mode learns the dosing rates entered by the operator/field personnel for each nutrients and continuously calculates the dosing ratio in the controller program based on existing wastewater flow rate, until the field personnel/operator is ready to switch from manual to automatic mode of dosing. As soon as the field personnel/operator switches the controller program from manual to automatic mode of dosing the nutrients, the dosing amount of nutrients gets manipulated automatically by the controller program based on the last dosing ratio point, following a pattern on the linear equation curve for corresponding incoming wastewater flow. Hence, when in automatic mode, if the incoming wastewater flow rate increases or decreases, the nutrients dosing rate gets adjusted automatically based on the pattern learned by the controller to derive the dosing ratio when it was in manual mode.

Having the control system run the automatic dosing mode does not require operator/field personnel intervention continuously to change dosing rates of nutrients with changing flow rates of wastewater going to the bioreactor. It also gives better accuracy and prompt control action due to all calculation being done by the controller at mere scan rate of 20 milliseconds, which ultimately helps improve the growth and lifespan of living microorganisms inside the bioreactor achieving better productivity for removing the impurities from the wastewater.

SPECIFIC EMBODIMENTS

While the following is described in conjunction with specific embodiments, it will be understood that this description is intended to illustrate and not limit the scope of the preceding description and the appended claims.

A first embodiment of the invention is a process for treatment of water that contains contaminants comprising measuring a parameter of a water stream; dosing an amount of nutrients needed; adding the nutrients to the water stream to create a treated water stream; and sending the treated water stream to a bioreactor. An embodiment of the invention is one, any or all of prior embodiments in this paragraph up through the first embodiment in this paragraph wherein the water stream is an industrial waste water stream. An embodiment of the invention is one, any or all of prior embodiments in this paragraph up through the first embodiment in this paragraph further comprising contaminants in the industrial waste water stream such as selenium. An embodiment of the invention is one, any or all of prior embodiments in this paragraph up through the first embodiment in this paragraph wherein the parameter of the water stream measured is the flowrate of the water stream. An embodiment of the invention is one, any or all of prior embodiments in this paragraph up through the first embodiment in this paragraph wherein the parameter of the water stream measured is the nutrient level of the water stream. An embodiment of the invention is one, any or all of prior embodiments in this paragraph up through the first embodiment in this paragraph wherein the parameter of the water stream measured is the flowrate and nutrient level of the water stream. An embodiment of the invention is one, any or all of prior embodiments in this paragraph up through the first embodiment in this paragraph wherein the measured parameter comprises nitrate. An embodiment of the invention is one, any or all of prior embodiments in this paragraph up through the first embodiment in this paragraph wherein the added nutrient comprises MicroC® or phosphoric acid. An embodiment of the invention is one, any or all of prior embodiments in this paragraph up through the first embodiment in this paragraph wherein the added nutrients comprise MicroC® and phosphoric acid. An embodiment of the invention is one, any or all of prior embodiments in this paragraph up through the first embodiment in this paragraph wherein the flow rate of the water stream may be monitored in real time. An embodiment of the invention is one, any or all of prior embodiments in this paragraph up through the first embodiment in this paragraph wherein the flow rate of the treated water stream is monitored.

A second embodiment of the invention is a system for treatment of water that contains contaminants comprising a measuring device in fluid communication with an inlet water source containing at least one contaminant; a nutrient dosing unit in fluid communication with the inlet water source wherein the nutrient dosing unit is controlled by a control system; and a treated water source in fluid communication with a bioreactor. An embodiment of the invention is one, any or all of prior embodiments in this paragraph up through the second embodiment in this paragraph wherein the measuring device is measuring the flowrate of the water stream. An embodiment of the invention is one, any or all of prior embodiments in this paragraph up through the second embodiment in this paragraph wherein the measuring device is measuring the nitrate level of the water stream. An embodiment of the invention is one, any or all of prior embodiments in this paragraph up through the second embodiment in this paragraph wherein the measuring device is measuring the flowrate and nitrate level of the water stream. An embodiment of the invention is one, any or all of prior embodiments in this paragraph up through the second embodiment in this paragraph wherein the nutrient dosing system is configured to dose MicroC®. An embodiment of the invention is one, any or all of prior embodiments in this paragraph up through the second embodiment in this paragraph wherein the nutrient dosing system is configured to dose phosphoric acid. An embodiment of the invention is one, any or all of prior embodiments in this paragraph up through the second embodiment in this paragraph wherein the nutrient dosing system is configured to dose both MicroC® and phosphoric acid. An embodiment of the invention is one, any or all of prior embodiments in this paragraph up through the second embodiment in this paragraph wherein the control system can scan at a rate of once every 20 milliseconds to determine the dosage needed.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for treatment of water that contains contaminants comprising:
    measuring a parameter of a water stream, wherein the water stream is an industrial waste water stream comprising contaminants such as selenium;
    dosing an amount of nutrients;
    adding the nutrients to the water stream to create a treated water stream; and
    sending the treated water stream to a bioreactor, the bioreactor comprising micro-organisms, wherein the nutrients are utilized by the micro-organisms, and wherein the micro-organisms remove selenium from the treated water stream.

2. The process of claim 1 wherein the parameter of the water stream measured is a flowrate of the water stream.

3. The process of claim 1 wherein the parameter of the water stream measured is a nitrate level of the water stream.

4. The process of claim 1 wherein the parameter of the water stream measured is one of a plurality of parameters comprising a flowrate and a nitrate level of the water stream.

5. The process of claim 1 wherein the nutrient comprises MicroC® brand carbon source.

6. The process of claim 1 wherein one of the nutrients comprises phosphoric acid.

7. The process of claim 1 wherein the nutrients comprise MicroC® brand carbon source and phosphoric acid.

8. The process of claim 1 wherein a flow rate of the water stream is monitored in real time.

9. The process of claim 1 wherein the flow rate of the treated water stream is monitored.

10. A system for treatment of water that contains contaminants comprising:
    a measuring device in fluid communication with an inlet water source containing at least one contaminant, comprising selenium;
    a nutrient dosing unit in fluid communication with the inlet water source wherein the nutrient dosing unit is controlled by a control system; and
    a treated water stream in fluid communication with a bioreactor, the bioreactor comprising micro-organisms, wherein nutrients of the nutrient dosing unit are utilized by the micro-organisms, and wherein the micro-organisms remove selenium from the treated water stream.

11. The system of claim 10 wherein the measuring device is configured to measure a flowrate of the inlet water source.

12. The system of claim 10 wherein the measuring device is configured to measure a nitrate level of the inlet water source.

13. The system of claim 10 wherein the nutrient dosing unit is configured to dose MicroC® brand carbon source.

14. The system of claim 10 wherein the nutrient dosing unit is configured to dose phosphoric acid.

15. The system of claim 10 wherein the nutrient dosing unit is configured to dose both MicroC® brand carbon source and phosphoric acid.

16. The system of claim 10 wherein the control system can scan at a rate of once every 20 milliseconds to determine the dosage.

* * * * *